(12) United States Patent
Ben Abdallah et al.

(10) Patent No.: US 8,909,823 B2
(45) Date of Patent: Dec. 9, 2014

(54) DATA PROCESSING DEVICE, CHAIN AND METHOD, AND CORRESPONDING RECORDING MEDIUM FOR DIVIDING A MAIN BUFFER MEMORY INTO USED SPACE AND FREE SPACE

(75) Inventors: Riadh Ben Abdallah, Villeurbanne (FR); Antoine Fraboulet, Lyons (FR); Jerome Martin, Meylan (FR); Tanguy Risset, Villeurbanne (FR)

(73) Assignees: Commissariat a l'Energie Atomique et aux Energies Alternatives, Paris (FR); Institut National de Recherche en Informatique et en Automatique, Le Chesnay (FR)

( * ) Notice: Subject to any disclaimer, the term of this patent is extended or adjusted under 35 U.S.C. 154(b) by 0 days.

(21) Appl. No.: 13/806,852

(22) PCT Filed: Jun. 23, 2011

(86) PCT No.: PCT/FR2011/051456
§ 371 (c)(1),
(2), (4) Date: Dec. 26, 2012

(87) PCT Pub. No.: WO2011/161386
PCT Pub. Date: Dec. 29, 2011

(65) Prior Publication Data
US 2013/0111079 A1    May 2, 2013

(30) Foreign Application Priority Data
Jun. 25, 2010 (FR) ...................................... 10 55125

(51) Int. Cl.
*G06F 13/28* (2006.01)

(52) U.S. Cl.
CPC ..................................... *G06F 13/28* (2013.01)
USPC .................... 710/23; 710/22; 710/25; 710/28

(58) Field of Classification Search
None
See application file for complete search history.

(56) References Cited

U.S. PATENT DOCUMENTS

| 5,347,634 A | 9/1994 | Herrell et al. |
| 5,598,575 A * | 1/1997 | Dent et al. ....................... 710/28 |
| 2003/0007396 A1 * | 1/2003 | Walker et al. ................. 365/200 |
| 2009/0235019 A1 | 9/2009 | Costin et al. |

OTHER PUBLICATIONS

International Search Report Issued Oct. 17, 2011 in PCT/FR11/51456 Filed Jun. 23, 2011.

* cited by examiner

*Primary Examiner* — Idriss N Alrobaye
*Assistant Examiner* — David Martinez
(74) *Attorney, Agent, or Firm* — Oblon, Spivak, McClelland, Maier & Neustadt, L.L.P.

(57) ABSTRACT

A data processing device includes a memory, a direct memory access controller including a receiving module configured to receive data coming from outside the device and for writing the data in a main buffer memory of the memory, and a processing unit programmed to read and process data written by the receiving module in a work area of the main buffer memory. The main buffer memory is divided between a used space, where the receiving module is configured not to write, and free space, where the receiving module is configured to write. The processing unit is further programmed to define the work area, and the direct memory access controller includes a buffer memory manager configured to free data written in the main buffer memory, by defining a location of this data as a free space, only when this data is outside the work area.

12 Claims, 7 Drawing Sheets

DATA PROCESSING DEVICE, CHAIN AND METHOD, AND CORRESPONDING RECORDING MEDIUM FOR DIVIDING A MAIN BUFFER MEMORY INTO USED SPACE AND FREE SPACE

BACKGROUND (1) Field

This invention relates to a data processing device, a data processing chain comprising such a device, a data processing method and a corresponding computer program.

The invention more specifically applies to the field of digital signal processing, in particular but not exclusively for audio/video transmission encoding/decoding or data transmission according to a wired or wireless communication protocol.

The following terminology will be used throughout the text, as well as in the claims.

A "programmed processing unit" is a processing unit designed to execute a computer program, i.e. to read instructions and execute them.

A "hardware processing unit" is an electronic circuit designed to perform one or more predefined and fixed processing operations. The processing is defined by the organization of components in the processing unit. A hardware processing unit is, for example, a machine with hardware states and registries.

A "pointer" is a data item indicating a memory address, either directly (the data item is the memory address), or indirectly (the data item is, for example, the address of a location where the indicated memory address is written). To illustrate which location is indicated by a pointer, this pointer will be represented in the figures next to the location.

The phrase "to free data" means defining the location where it is written as free space, so that a new data item can be written there.

(2) Description of the Related Art

A "primitive" is a computing function, i.e. a set of instructions, written so as to take advantage, as much as possible, of the particular characteristics of the hardware intended to execute it. It is also said to be a "basic" function, by contrast with advanced functions written generically without taking into account particular characteristics of the hardware on which they can be executed.

To process data, it is known to use a device comprising (i) a memory, (ii) a direct memory access controller comprising a receiving module designed to receive data coming from outside the device and to write it in a predetermined portion of the memory, called the main buffer memory, and (iii) a processing unit programmed to read and process data written by the receiving module in the main buffer memory.

Indeed, a direct memory access controller or DMA controller makes it possible to transfer data to be processed or provided by the processing unit, coming from or going to a peripheral such as a communication port, a hard disk or any memory, between this peripheral and a local memory of the device, for example, without intervention of the processing unit except to initiate and conclude the transfer.

A DMA controller is, for example, very useful in a system wherein repeated fast access to peripherals may otherwise almost block or at least slow the processing performed by the processing unit. Its presence optimizes the processing time of the software applications executed by the processing unit by letting the DMA controller manage the data transfers from and to the local memory.

In addition, the processing unit implements a computer program to perform the data processing, so that it is relatively easy to modify the processing by modifying the program, or even completely change it by having another program executed with the processing unit. Thus, the processing device with the programmed processing unit is very flexible.

Moreover, it is known to form a "data flow" processing chain with hardware units connected to one another. In such an architecture, data continuously passes from one unit to another: there is no interruption of the flow.

To provide flexibility in the processing chain, it may be beneficial to insert a programmed processing unit into the processing chain.

However, a programmed processing unit needs to have access to a certain predetermined number of data items at the same time in order to perform each step of its processing, so that it risks interrupting the data flow and degrading the performance of the processing chain, or even producing errors in the processing chain, insofar as it does not have access to all of this data.

In addition, the publication of the patent application No. US 2009/0235019A1 describes a system equipped with a DMA module and a processor saving data in a lockable memory.

It may thus be desired to provide a processing device, comprising a programmed processing unit, suitable for being integrated in a data flow processing chain.

BRIEF SUMMARY

The invention therefore relates to a data processing device comprising (i) a memory, (ii) a direct memory access controller comprising a receiving module designed to receive data coming from outside the device and for writing it in a predetermined portion of the memory, called the main buffer memory, (iii) a processing unit programmed to read and process data written by the receiving module in an area of the main buffer memory, called the work area, with the main buffer memory being divided between the used space and the free space, the processing unit further being programmed to define the work area, and the direct memory access controller comprising a buffer memory manager designed to free data written in the main buffer memory, by defining the location(s) of this data as free space, only when this data is outside the work area.

Owing to the invention, the DMA controller of a device with a programmed processing unit may continue to receive and send data from and to the main buffer memory, without risking corrupting the data that the processing unit needs, i.e. that contained in the work area. Thus, the processing unit may have access to the data that it needs without the data flow being interrupted. Further, the work area being defined by the programmed processing unit, the latter can therefore be programmed so that this work area evolves as flexibly as possible so as to optimize its integration in the processing chain.

Optionally, the processing unit is programmed to wait for the receiving module to write data received in the entire work area before reading and processing the data of the work area.

Also optionally, the receiving module is designed to write each data item received in the location of the main buffer memory indicated by a pointer, called the input pointer, and the buffer memory manager is designed so as to, after the writing of a data item by the writing module, move the input pointer toward the next location according to a predetermined circular path of the main buffer memory.

Also optionally, the processing unit is programmed to write data in the work area in the place of data written by the receiving module.

Also optionally, the direct memory access controller comprises a transmission module designed to read data written in the main buffer memory and transmit it outside the device.

Also optionally, the transmission module is designed to read and transmit, outside the device, the data written in the location indicated by a pointer, called the output pointer, the work area is between a work area start pointer and a work area end pointer, according to a predetermined circular path of the main buffer memory, and the buffer memory manager is designed to free the data item read and transmitted by moving the output pointer to the next location according to the circular path, only if the output pointer is different from the work area start pointer.

Also optionally, the processing unit is programmed to define the work area by moving the work area start pointer and/or the work area end pointer.

Also optionally, the processing unit is programmed to define an area, called the auxiliary work area, of another predetermined portion, called the auxiliary buffer memory, of the memory, the processing unit is programmed to write data in the auxiliary work area, and the direct memory access controller is designed to read, transmit to the outside of the device, and free data from the auxiliary buffer memory, but only when it is outside the auxiliary work area.

The invention also relates to a data processing chain, comprising a plurality of processing devices configured so as to process a data flow, wherein one of the processing devices is a device as defined above.

The invention also relates to a data processing method, comprising reading and processing, by a processing unit, of written data, by a direct memory access controller, in a predetermined portion of a memory, called the main buffer memory, further comprising the following steps:
  definition, by the processing unit, of an area, called the work area, in the main buffer memory,
  reading and processing of data written in the work area,
  the main buffer memory being divided between the used space and the free space, freeing, by the direct memory access controller, of data written in the main buffer memory, by defining the location(s) of this data as free space, only when this data is outside the work area.

Finally, the invention also relates to a computer program that can be downloaded from a communication network and/or stored on a computer readable medium and/or executed by a processor, including instructions for defining a work area in a portion, called the main buffer memory, of a memory of a device, when said program is executed by a processing unit of this device having read access to this work area, the device further comprising a direct memory access controller designed to write data received from outside the device in the main buffer memory, the latter being divided between the used space and the free space, and the direct memory access controller being designed so as to free data written in the main buffer memory only when this data is outside the work area.

BRIEF DESCRIPTION OF THE DRAWINGS

The invention will be better understood in view of the following description, provided solely as an example, and with reference to the appended drawings, wherein.

DETAILED DESCRIPTION

Figure 1:
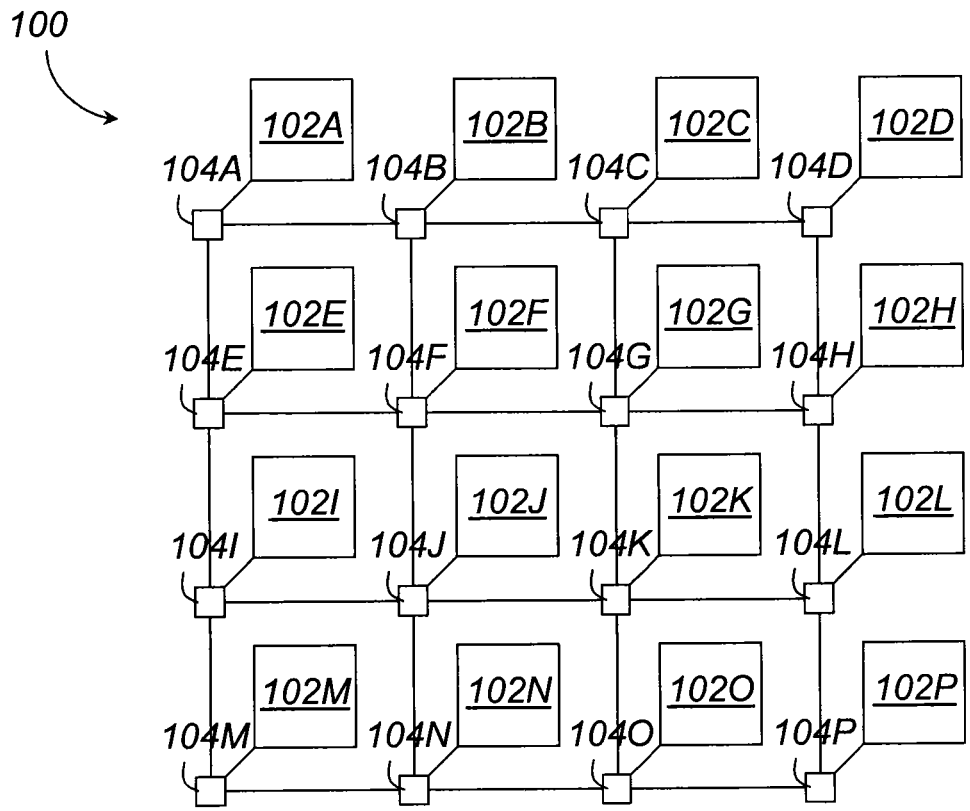
FIG. 1 diagrammatically shows the general structure of a network-on-chip of data processing devices according to an embodiment of the invention, FIG. 2 diagrammatically shows the general structure of an example of a data processing chain produced by the network of FIG. 1, FIG. 3 diagrammatically shows one of the processing devices, with a programmed processing unit, of the network of FIG. 1, FIGS. 4 to 6 show the successive steps of methods implemented by the device of FIG. 3, FIGS. 7 to 13 show an example of a change in the content of a main buffer memory of the device of FIG. 3 during its operation, FIG. 14 diagrammatically shows an alternative of the device of FIG. 3.

In reference to FIG. 1, a network-on-chip (NoC) 100 according to the invention comprises a plurality of processing devices 102A . . . 102P and a plurality of routers 104A . . . 104P. The routers 104A . . . 104P are connected to one another and each of them is further connected to a respective processing device. Alternatively, and as is generally the case in practice, each router may be connected to a plurality of processing devices. Thus, data can be exchanged between the devices 102A . . . 102P by means of routers asynchronously. This architecture is called "data flow" or "data synchronized".

Devices 102B . . . 102P are, for example, hardware processing units, i.e. the processings are performed by fixed electronic circuits, and not by a processor executing a program.

Device 102A is, for example different in that the processing is performed by a processing unit, such as a generic processor or a specialized signal processing processor (digital signal processor or DSP) implementing a data processing computer program as well be explained below.

Alternatively, the network-on-chip 100 may comprise a plurality of programmed processing unit devices such as device 102A located freely on one or more routers of the architecture.

Moreover, device 102A may be designed so as to configure the network 100 so that the latter forms a processing chain, i.e. a chain of at least some of devices 102A . . . 102P. To this end, device 102A is in particular designed so as to configure each device of the processing chain desired so that this device transmits the data that it has processed to the next device of the processing chain.

Figure 2:
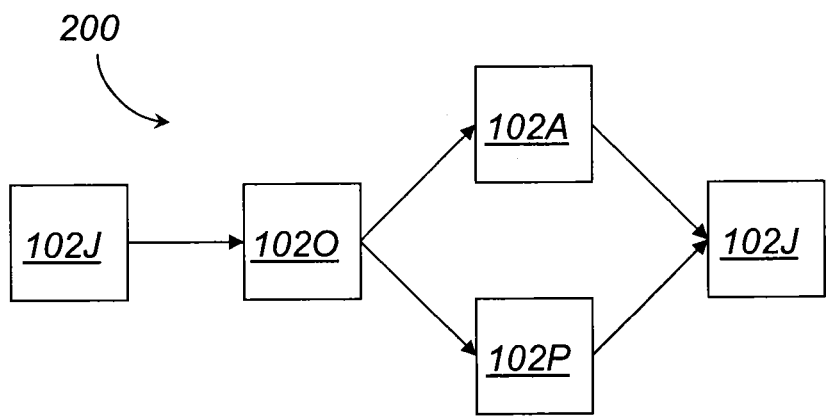

An example of a processing chain 200 is shown in FIG. 2. In this example, the processing chain 200 is constituted by device 102J, followed by the processing device 102O, followed by devices 102A and 102P in parallel, the last two being followed by the processing device 102J. Device 102A therefore has two functions: configuration of the network into a processing chain, and processing of the data. It will be noted, however, that, alternatively, the configuration of the network into a processing chain may be managed by a device other than device 102A.

Figure 3:
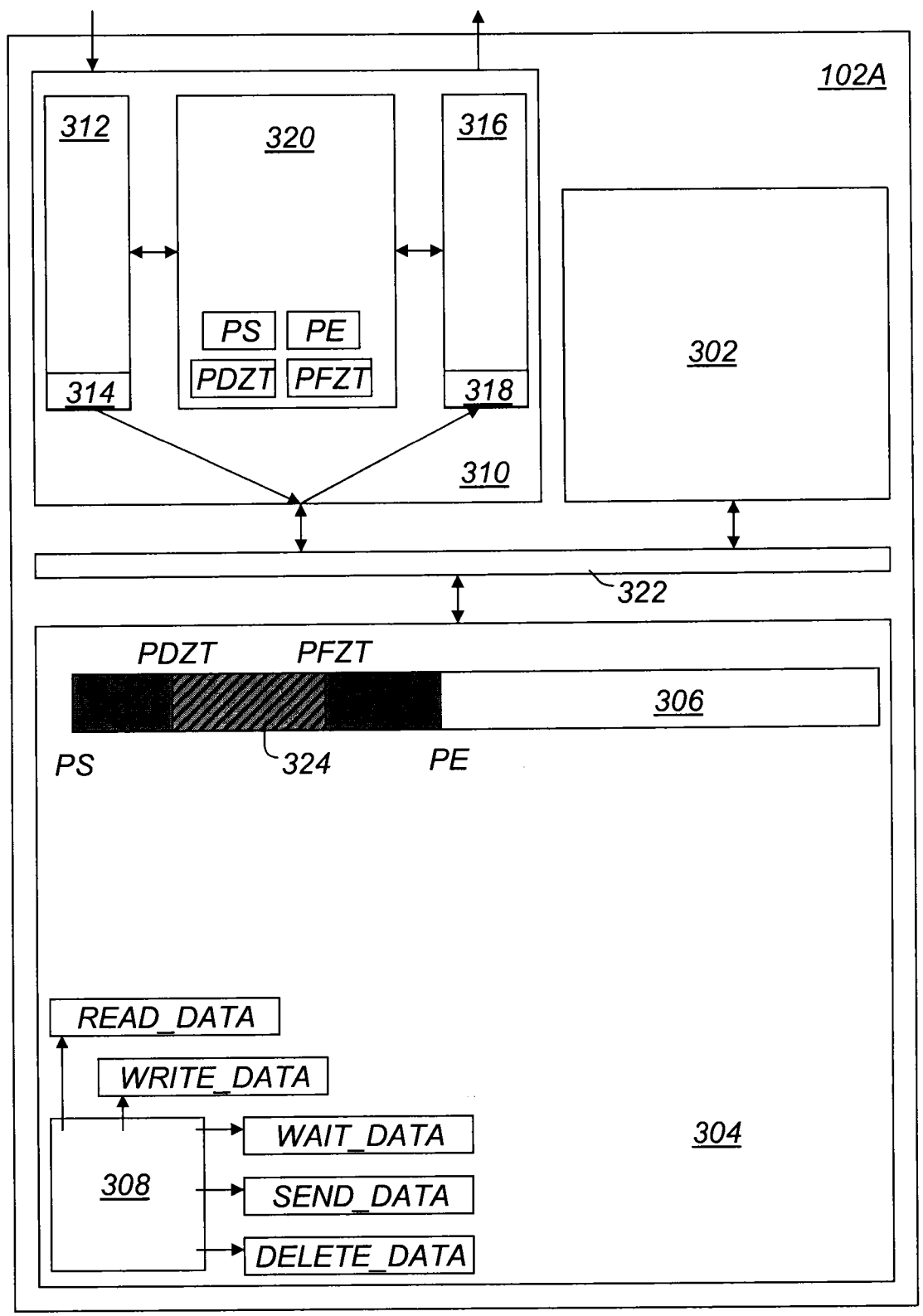

In reference to FIG. 3, device 102A first comprises a processing unit 302 designed so as to execute programs that will be detailed below.

Device 102A further comprises a rewritable memory 304. In the example described, it is a random access memory (RAM).

A portion 306 of the memory 304, called the main buffer memory, is defined in the memory 304.

Further, a processing program 308 is stored in the memory 304, as well as the following primitives: WAIT_DATA, SEND_DATA, DELETE_DATA, READ_DATA and WRITE_DATA, which will be described in detail below. The primitives are, for example, combined in a function library. The processing program 308 is intended to be executed by the processing unit 302 and calls on the primitives. Alternatively, the processing program 308 and/or the instructions of the primitives may be stored elsewhere, in an ROM memory, flash or the like.

The processing program 308 is either executed directly by the processing unit 302—in this case it is stored in machine language understandable by the processing unit, like the primitives that it calls—or it is executed indirectly by means of a virtual machine, such as the Java (registered trademark) virtual machine. In this latter case, the processing program 308 and the primitives are stored in a virtual machine language and the processing unit executes a virtual machine program translating, on the fly, the virtual machine language into machine language understandable by the processing unit 302.

Device 102A further comprises a DMA (direct memory access) controller 310, which is intended to manage the reading/writing operations in the memory 304 in the place of the processing unit 302, so that the operation of the latter is not slowed by these operations.

The DMA controller 310 first comprises a receiving module 312 designed to receive data coming from outside device 102A, in particular from the processing device(s) that precede it in the processing chain. It comprises a memory 314 of the "first in, first out" type, also called FIFO memory, where the data received is temporarily stored. The receiving module 312 is further designed to write the data received (which is stored in its FIFO memory 314) in the main buffer memory 306, as will be described in detail below.

The DMA controller 310 further comprises a transmission module 316 designed to read data written in the main buffer memory 306 and transmit it outside device 102A, in particular to the processing device(s) that follow it in the processing chain. It comprises a FIFO memory 318 wherein the data read is temporarily stored before being sent to the next device(s).

The DMA controller 310 further comprises a buffer memory manager 320 designed, on the one hand, to indicate to the receiving module 312 the locations of the main buffer memory 306 in which to write the data received, and, on the other hand, to indicate to the transmission module 316 the locations of the main buffer memory 306 in which to read the data written in order to transmit it outside device 102A.

Device 102A further comprises a data transfer bus 322 to which the processing unit 302, the DMA controller 310 and the memory 304 are connected, so that these three elements can exchange data or information messages between each other.

The DMA controller 310 is designed to manage the main buffer memory 306 in a circular manner by using pointers, as will now be explained. In the example described, the pointers used are stored in a memory (not shown) of the buffer memory manager 320.

Thus, the receiving module 312 is designed to write each data item received via its FIFO memory 314 in the location of the main buffer memory 306 indicated by a pointer, called the input pointer IP and to inform the buffer memory manager 320 of the writing. The buffer memory manager 320 is designed to move this input pointer IP (i.e. to modify its value), after each writing, to the next location according to the predetermined circular path of the main buffer memory 306. Thus, the input pointer IP is moved along the circular path. In the example described, the main buffer memory 306 consists of locations of the memory 304 adjacent to one another, so that the main buffer memory 306 is defined by a starting address and an ending address in the memory 304. In this case, the input pointer IP is moved by the buffer memory manager 320 from the starting address to the ending address, then again to the starting address, and so on.

The buffer memory manager 320 is further designed to ask the transmission module 316 to perform a reading and sending operation. The transmission module 316 is designed, in response to this request, to read and transmit, outside device 102A, via its FIFO memory 318, the data item written in the location of the main buffer memory 306 indicated by a pointer, called the output pointer OP, except in a case that will be described in detail below. The buffer memory manager 320 is then designed to move the output pointer OP, after each reading and transmission by the module 316, to the next location according to the circular path. The output pointer OP is therefore moved like the input pointer IP.

The space used (indicated in gray in FIG. 3) of the main buffer memory 306 consists of locations located from the output pointer OP to the input pointer IP according to the circular path, while the free space of the buffer memory consists of locations from the input pointer IP to the output pointer OP according to the circular path.

Thus, each movement of the output pointer OP corresponds to a freeing of the memory location indicated by the output pointer OP (before it is moved), i.e. this location becomes the free space where new data can be written. It will be noted that, generally, the data is still physically present in the free space, but it is erased in terms of logic.

The buffer memory manager 320 is thus designed to free locations of the main buffer memory 306 of which the data is read and transmitted outside device 102A by the transmission module 316.

Below, to be capable of defining relative positions between pointers along the circular path, the output pointer OP will be used as the origin of this circular path.

The processing unit 302 is designed to execute the processing program 308.

The processing program 308 comprises instructions for defining an area 324 of the main buffer memory 306, called a work area, wherein the buffer memory manager 320 is designed not to free locations, i.e. it is designed to free only locations of the main buffer memory 306 located outside the work area 324. The work area 324 is represented in hatched lines in FIG. 3 and following. In the example described, the work area 324 is defined by a work area start pointer WASP and a work area end pointer WAEP located after the work area start pointer WASP in the direction of the circular path. Thus, the buffer memory manager 320 is designed to read and transmit, outside device 102A, the location data indicated by the output pointer OP (then free this location) only when the latter is located before the work area start pointer WASP (configuration shown in FIG. 3), and not when the two pointers are equal, i.e. they show the same location. Thus, the integrity of the work area 324 is preserved.

To define the work area 324, i.e. in particular to sequentially manage its change, the processing program 308 comprises calls to primitives comprising instructions to move the work area start pointer WASP and the work area end pointer WAEP.

Thus, the primitive WAIT_DATA comprises instructions for moving the work area end pointer WAEP a certain distance according to the circular path. In the example described, this is performed by incrementing the value of the work area end pointer WAEP by N1 locations according to the circular path: WAEP←WAEP+N1.

The processing program 308 needs a certain amount of data to be capable of processing it. If this amount is not available, it cannot apply the desired processing. Thus, preferably, the distance of movement of the work area start pointer WASP is chosen so that the capacity of the work area 324 (distance between work area start pointers WASP and work area end pointers WAEP) after movement is equal to or greater than this minimal amount of data.

When the work area end pointer WAEP is moved before the input point IP, this means that the work area 324 is not full and therefore that not all of the data needed for the processing is available. The primitive WAIT_DATA then comprises instructions to wait for the work area 324 to fill up. Thus, the primitive instructions WAIT_DATA may be intended to periodically read the two pointers WAEP and IP and compare them (so-called polling method). Alternatively, it is the buffer memory manager 320 that is designed to compare these two pointers and produce an interruption of the processing unit 302 (in the sense that the processing unit, as the processor, receives and recognizes a signal that causes it to change its state) when they become equal.

Preferably, during this wait, the processing unit 302 is capable of executing other programs or other tasks in the program 308.

The primitive SEND_DATA comprises instructions for moving the work area start pointer WASP a certain distance according to the circular path. This movement causes data to leave the work area 324, which data may then be read and transmitted by the DMA controller 310. In the example described, this is performed by incrementing the value of the work area start pointer WASP by N2 locations according to the circular path: WASP←WASP+N2. During the reading and sending, to the outside, of the data by the DMA controller 310, the processing unit 302 is designed to be capable of working in its work area 324.

The primitive DELETE_DATA comprises instructions for moving the work area start pointer WASP and the output pointer OP together, when they are equal (i.e. when the controller no longer has data to read and transmit), a certain distance according to the circular path. In this way, the work area output data 324 is located in the free space of the main buffer memory 306 without being read or transmitted by the DMA controller 310, which amounts to erasing it. In the example described, this is performed by incrementing the value of the work area start pointer WASP and the value of the output pointer OP by N3 movements according to the circular path: WASP←WASP+N3 and OP←OP+N3.

The processing program 308 further comprises calls to the following primitives.

The primitive READ_DATA comprises instructions for reading data written in the work area 324, in direct access, i.e. without passing through the DMA controller 310. Preferably, the processing program 308 combines the primitives WAIT_DATA and READ_DATA so as to read data in the main buffer memory 306 in order to process it, only when the work area 324 is full, i.e. when the input pointer IP is located after the work area end pointer WAEP according to the circular path with the output pointer as the origin.

The primitive WRITE_DATA comprises instructions for writing data in the work area 234 in the place of data written by the receiving module 312. The writing is performed in direct access by the processing unit 302 executing the primitive, i.e. without passing through the DMA controller 310. The data written is in particular data processed by the processing program 308. The processing program 308 combines the primitives WRITE_DATA and SEND_DATA in order to be capable of transmitting the processed data to the outside, passing through the DMA controller 310.

Owing to the use of the work area 324, the DMA controller 310 can continue to read, transmit data from the main buffer memory 306 and free their locations, without risking corrupting the data used by the processing unit 302 executing the processing program 308, i.e. the data contained in the work area 324. Thus, the processing and sending of the processed data can be performed in parallel, so that the processing speed of device 102A is improved, making it possible to prevent this device 102A from forming a "bottleneck" for the data flow passing through the processing chain.

Figure 4:
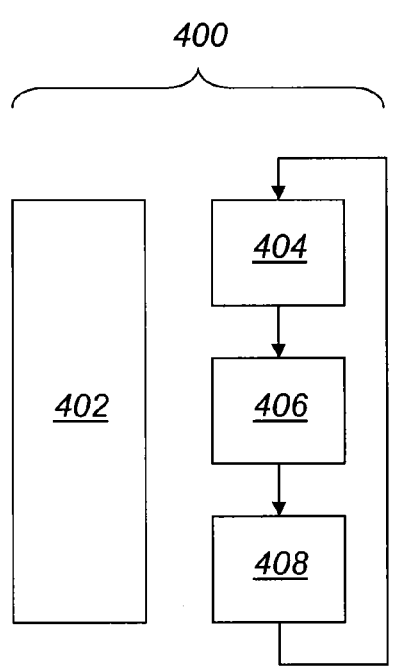

In reference to FIG. 4, device 102A implements a data receiving method 400 comprising the following steps.

In a step 402, the receiving module 312 receives a data item from outside device 102A and stores it in its FIFO memory 314.

In parallel with step 402, during a step 404, the receiving module 312 transfers the data whose turn it is (the oldest contained in the FIFO memory 314) from the FIFO memory 314 to the location indicated by the input pointer IP.

In a step 406, the receiving module 312 informs the buffer memory manager 320 of the writing performed.

In a step 408, the buffer memory manager 320 moves the input pointer IP to the next location of the main buffer memory 306 according to the circular path.

Figure 5:
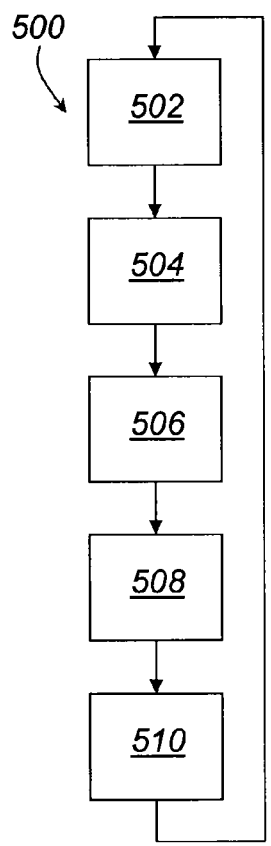

In reference to FIG. 5, the processing unit 302 implements, by executing the processing program 308, a processing method 500 comprising the following steps.

In a step 502, the processing unit 302 defines the work area 324 by means of the primitive WAIT_DATA and, as the case may be, waits for the work area 324 to fill up.

During a step 504, the processing unit 302 reads, by means of the primitive READ_DATA, data of the work area 324 and applies the processing provided in the processing program 308 to it. In audio/video transmission, for example, the processing program may include FFT, Viterbi or other computations.

In a step 506, the processing unit 302 writes, by means of the primitive WRITE_DATA, at the start of the work area 324, the data processed.

In a step 508, the processing unit 302 again defines the work area by means of the primitive SEND_DATA, so that the DMA controller 310 reads and transmits the processed data it, then frees the space occupied by the data.

In a step 510, the processing unit 302 again defines the work area 324 by executing, for example, the primitive DELETE_DATA in order to move the work area start pointer WASP and the output pointer OP together the same distance, so that the locations preceding these two pointers, once moved, are in the free space of the main buffer memory 306, without the data that they contain having been read and transmitted by the DMA controller 310.

The method 500 then returns to step 502.

Figure 6:
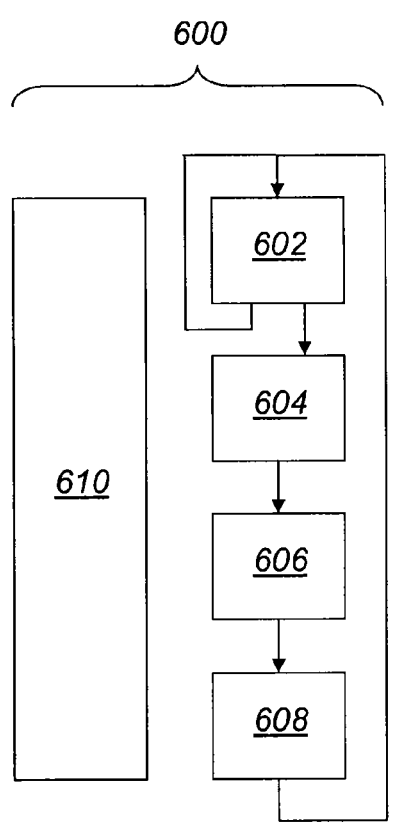

In reference to FIG. 6, device 102A implements a data transmission method 600 that comprises the following steps.

In a step 602, the buffer memory manager 320 compares the output pointer OP and the work area start pointer WASP. If they are equal, the method returns to step 602. If the work area start pointer WASP is in front of the output pointer OP, the method goes on to step 604.

In step 604, the buffer memory manager 320 asks the transmission module 316 to perform an operation of reading and transmitting a data item outside.

In response, in a step 606, the transmission module 316 reads and copies, in its FIFO memory 318, the data item indicated by the output pointer OP, in order to transmit this data item from the FIFO memory to the outside of the device 102A when its turn comes up.

In a step 608, the buffer memory manager 320 moves the output pointer OP to the next location according to the circular path. By this movement, it frees the location of the data transmitted.

The method 600 then returns to step 602.

In parallel with steps 602 to 608, during a step 610, the transmission module 316 transmits, one by one, the data according to its order of arrival in the FIFO memory 318.

In reference to FIGS. 7 to 13, an example of a change in the content of the main buffer memory 306 will now be described.

Figure 7:

In reference to FIG. 7, initially, the main buffer memory is empty, and the four pointers, IP, OP, WASP, WAEP, indicate the starting address of the main buffer memory 306.

Figure 8:

In reference to FIG. 8, data is received and written in the main buffer memory 306 by the DMA controller 310, according to the method of FIG. 4. The input pointer IP is therefore moved and is then located in front of the other pointers.

Figure 9:
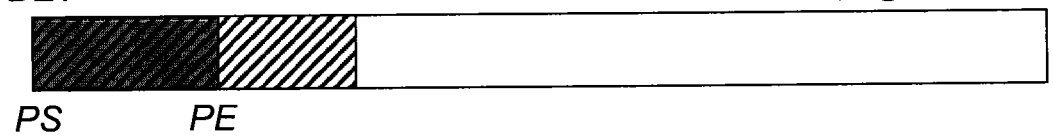
Figure 10:

In reference to FIG. 9, and in accordance with step 502 of FIG. 5, the processing unit 302 executes the instructions of the primitive WAIT_DATA to move the work area end pointer WAEP forward so as to define the work area 324 with a capacity corresponding to the amount of data necessary for the processing program 308 to be capable of processing the data. In the example described, the work area end pointer WAEP is moved in front of the input pointer IP, so that the work area 324 is not full. Thus, the processing unit 302 waits for the work area to fill up.

In reference to FIG. 10, data is again received and written in the main buffer memory 306 by the DMA controller 310, according to the method of FIG. 4. The input pointer IP is then in front of the work area end pointer WAEP, which indicates that the work area 324 is full. Consequently, the processing unit 302 leaves its wait mode, reads (by means of the primitive READ_DATA in accordance with step 504 of FIG. 5) and processes the data as explained above, then writes (by means of the primitive WRITE_DATA in accordance with step 506 of FIG. 5) the data processed at the start of the work area 324. As the output pointer OP is equal to the work area start pointer WASP, no reading, transmission or freeing of locations of the work area 324 takes place.

Figure 11:
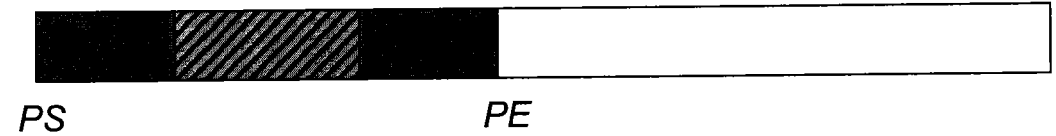

In reference to FIG. 11 and in accordance with step 508 of FIG. 5, the processing unit 302 executes the instructions of the primitive SEND_DATA in order to move the work area start pointer WASP forward, so as to cause the processed data to leave the work area. As the work area start pointer WASP is then located in front of the output pointer OP, the DMA controller 310 can transmit the processed data and free the locations that it occupied by moving the output pointer OP forward, according to the method of FIG. 6.

Figure 12:

In reference to FIG. 12, the output pointer OP joins the work area start pointer WASP, indicating that the DMA controller 310 has transmitted all of the processed data, and freed its locations.

Figure 13:

In reference to FIG. 13, and in accordance with step 510 of FIG. 5, the processing unit 302 executes the instructions of the primitive DELETE_DATA to move the work area start pointer WASP and the output pointer OP to the same location, which has the effect of placing the first locations of the work area in the free space of the main buffer memory.

Figure 14:
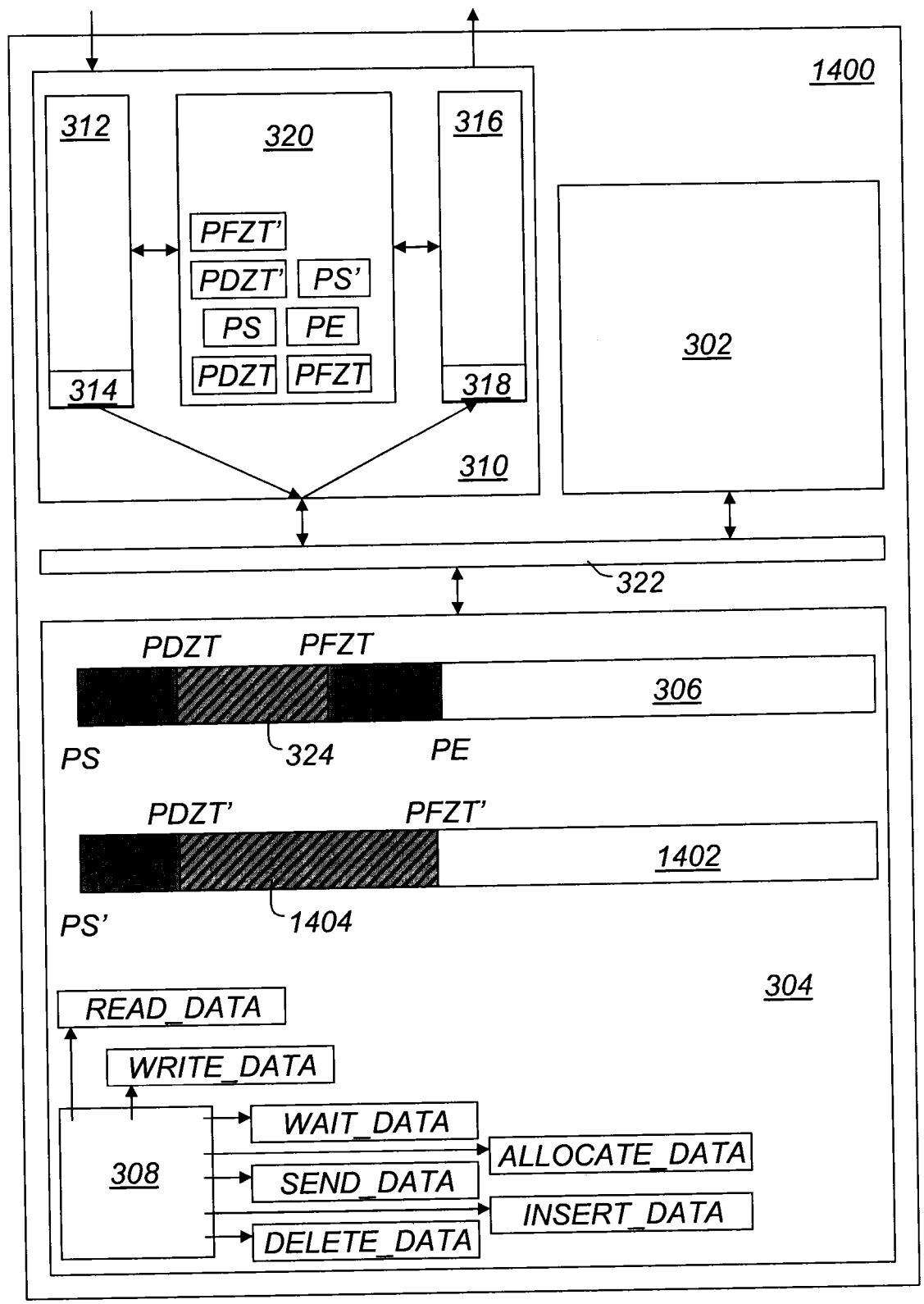

In reference to FIG. 14, we will now describe a device 1400 according to a second embodiment of the invention intended to replace device 102A of the previous figures. The elements common to the two devise 102A, 1400 are designated by the same reference signs.

Device 1400 is identical to device 102A, except for a portion 1402 of the memory 304, called the auxiliary buffer memory, defined in the memory 304. The processing unit 302 is programmed to write data in this auxiliary buffer memory 1402. Thus, the auxiliary buffer memory makes it possible for the processing unit 302 not to be limited by the capacity of the work area 324 of the main buffer memory 306 for writing data.

The transmission module 316 is further designed to read data written in the auxiliary buffer memory 1402 and to transmit it outside the device 1400, in the same way as for the main buffer memory 306. The buffer memory manager 320 is designed to indicate to the transmission module 316 the locations of the auxiliary buffer memory 1402 in which to read the written data in order to transmit it outside the device 1400.

In the example described, the DMA controller 310 is designed to also manage the auxiliary buffer memory 1402 in a circular manner. Thus, the buffer memory manager 320 is designed to ask the transmission module 316 to perform a reading and sending operation on the basis of the auxiliary buffer memory 1402. The transmission module 316 is designed, in response to this request, to read and transmit, outside the device 1400, the data written in the location of the auxiliary buffer memory 1402 indicated by a pointer, called the output pointer OP', except in a case that will be described in detail below. The buffer memory manager 320 is then designed to move the output pointer OP', after each reading and transmission, to the next location according to a circular path of the auxiliary buffer memory 1402. Thus, each movement of the output pointer OP' corresponds to a freeing of the memory location indicated by the output pointer OP' (before it moves), i.e. this location becomes the free space where new data can be written.

Below, to be capable of defining relative positions between the pointers along the circular path of the auxiliary buffer memory 1402, the output pointer OP' will be used as the origin of this circular path.

The processing program 308 comprises instructions for defining an area 1404 of the auxiliary buffer memory 1402, called the auxiliary work area, in which the buffer memory manager 320 is intended not to be capable of freeing locations, i.e. it is designed to free only locations of the auxiliary buffer memory 1402 located outside the auxiliary work area 1404. In the example described, the auxiliary work area 1404 is defined by an auxiliary work area start pointer WASP' and an auxiliary work area end pointer WAEP' located after the auxiliary work area start pointer WASP'. Thus, the buffer memory manager 320 is designed to read and transmit, outside the device 1400, the data item in the location indicated by the output pointer OP' (then free this location) only when the latter is located in front of the auxiliary work area start pointer WASP' (configuration shown in FIG. 14), and not when the two pointers are equal, i.e. when they show the same location. Thus, the integrity of the auxiliary work area 1404 is preserved.

To define the auxiliary work area 1404, the processing program 308 comprises calls to primitives ALLOCATE_DATA and INSERT_DATA comprising instructions to move the auxiliary work area start pointer WASP' and the auxiliary work area end pointer WAEP'.

Thus, the primitive ALLOCATE_DATA comprises instructions for moving the auxiliary work area end pointer WAEP' in the direction of the circular path. More specifically, the primitive ALLOCATE_DATA comprises instructions for determining whether the movement is greater than the distance between WAEP' and OP'. If this is not the case, the primitive is intended to wait until data is freed by the DMA controller 310 so that the output pointer OP' goes forward until the movement becomes greater than the desired movement. If this is the case, the primitive is then intended to move the auxiliary work area end pointer WAEP' by the desired movement.

The primitive instructions ALLOCATE_DATA may be intended to periodically read the two pointers WAEP' and OP' and determine their distance (so-called polling method). Alternatively, it is the buffer memory manager 320 that is designed to determine the distance between these two pointers and produce an interruption of the processing unit 302 (in the sense that the processing unit, as the processor, receives and recognizes a signal that causes it to change its state) when the distance separating them becomes greater than the desired movement.

The primitive INSERT_DATA comprises instructions for moving the auxiliary work area start pointer WASP' in the direction of the circular path. This movement has the effect of causing data to leave the auxiliary work area 1404, which data may then be read and transmitted by the transmission module 316 to the DMA controller 310.

It will be noted that the sequencing of the data transmitted by the transmission module 316 of the DMA controller 310 from the two buffer memories 306 and 1402 is defined by the sequencing, known to the DMA controller 310 owing to the updates of the pointers WASP and WASP', of the call of primitives SEND_DATA and INSERT_DATA by the processing program 308.

In this embodiment, the primitive WRITE_DATA further comprises instructions for writing, in the auxiliary work area 1404, in the same way as for the work area 324. Preferably, the processing program 308 calls the primitive WRITE_DATA to write processed data in the auxiliary work area 1404.

Figure 15:
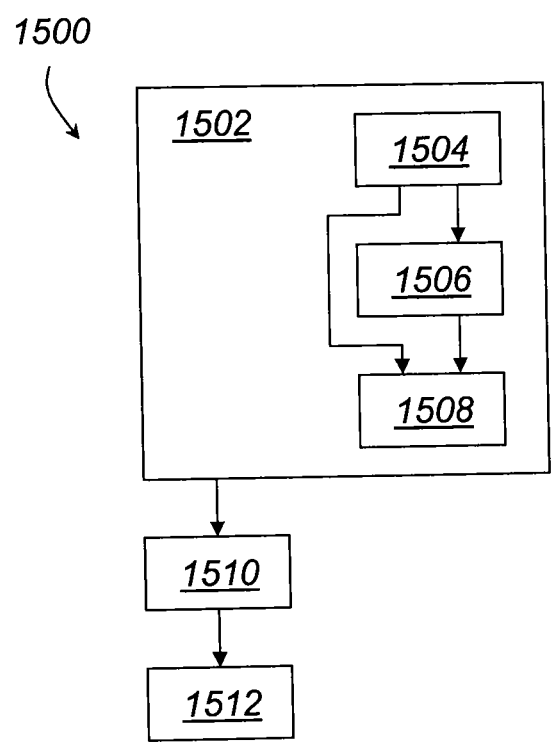
FIG. 15 shows the successive steps of a data transmission method implemented by a programmed processing unit of the device of FIG. 14, and FIGS. 16 to 23 show an example of a change in the content of an auxiliary buffer memory of the device of FIG. 14 during its operation.

In reference to FIG. 15, the processing unit 302 implements a method 1500 for transmitting data outside the device 1400.

In a step 1502, the processing unit 302 executes the instructions of the primitive ALLOCATE_DATA in order to move the auxiliary work area end pointer WAEP' by a certain desired amount. Step 1502 comprises the next steps 1504, 1506 and 1508.

Thus, in step 1504, the processing unit 302 determines whether the distance between the auxiliary work area end pointer WAEP' and the output pointer OP' is greater than the desired movement.

If the distance is less than the desired movement, in step 1506, the processing unit 302 waits for this distance to become greater than the desired movement. During this wait, the processing unit 302 can execute other programs.

If the distance is greater than the desired movement, in step 1508, the processing unit 302 moves the auxiliary work area end pointer WAEP' by the desired movement.

In a step 1510, the processing unit 302 executes the instructions of the primitive WRITE_DATA to write data, for example data processed by the processing program 308, in the auxiliary work area 1404.

In a step 1512, the processing unit 302 executes the instructions of the primitive INSERT_DATA to move the auxiliary work area start pointer WASP'. Thus, the output data of the auxiliary work area 1404 can be read and transmitted, and the locations that they occupy can be freed, by the DMA controller 310, in the same way as for the main buffer memory 324.

In reference to FIGS. 16 to 20, we will now describe an example of the change in content of the auxiliary buffer memory 1402 during the execution of the method of FIG. 15, if the desired movement of the auxiliary work area end pointer WAEP' is less than the distance between this pointer WAEP' and the output pointer OP'.

Figure 16:

In reference to FIG. 16, the auxiliary buffer memory 1402 is initially empty. The three pointers WAEP', WASP' and OP' are equal.

Figure 17:
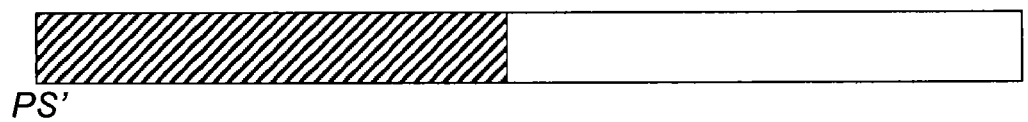

In reference to FIG. 17, the auxiliary work area end pointer WAEP' is moved in accordance with step 1508 by executing the primitive ALLOCATE_DATA.

Figure 18:

In reference to FIG. 18, data is written by the processing unit 302 in accordance with step 1510 by executing the primitive WRITE_DATA.

Figure 19:

In reference to FIG. 19, the auxiliary work area start pointer WASP' is moved in accordance with step 1512 by executing the primitive INSERT_DATA.

Figure 20:

In reference to FIG. 20, the output data of the auxiliary work area 1404 is read and transmitted, and its locations are freed, by the DMA controller 310, by causing the output pointer OP' to move forward. It will be noted that the output pointer OP' does not surpass the auxiliary work area start pointer WASP', thus ensuring the integrity of the auxiliary work area 1404.

Figure 21:
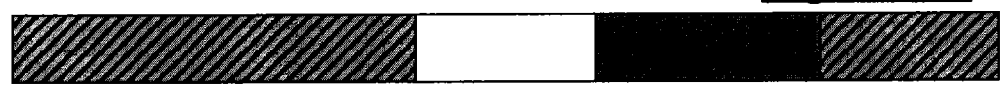
Figure 22:
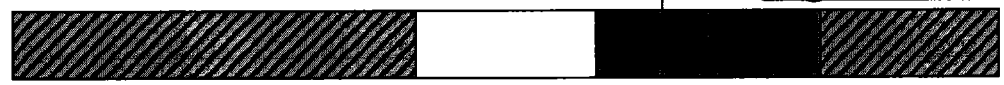
Figure 23:

In reference to FIGS. 21 to 23, we will now describe an example of a change in the content of the auxiliary buffer memory 1402 during the execution of the method of FIG. 15, if the desired movement of the auxiliary work area end pointer WAEP' is greater than the distance between this pointer WAEP' and the output pointer OP'.

In reference to FIG. 21, the auxiliary work area 1404 initially comprises data and the DMA controller 310 reads and transmits data, and frees its locations (the output pointer OP' is located in front of the auxiliary work area start pointer WASP').

In reference to FIG. 22, the processing unit 302 waits for the data to be transmitted by the DMA controller 310, so that the distance between the auxiliary work area end pointer WAEP' and the output pointer OP' becomes greater than the desired movement (indicated by an arrow in this figure), in accordance with step 1506.

In reference to FIG. 23, the processing unit 302 moves the auxiliary work area end pointer WAEP' in accordance with step 1508.

It should be noted that it is not stipulated that the DMA controller 310 writes data in the auxiliary buffer memory 1402.

It clearly appears that a processing device as described above is suitable for processing a data flow, without interrupting the flow, while being very flexible owing to the use of software processing.

It should also be noted that the invention is not limited to the embodiments described above. It will indeed appear to a person skilled in the art that various modifications can be made to the embodiments described above, in light of the teaching just disclosed.

In particular, the processing device 102A or 1400 may not modify the data flow passing through it, or may not transmit the data flow. The processing may then consist of a simple analysis of the data received—for example, the determination of a carrier frequency offset—in order to obtain configuration information of other processing devices of the processing chain—for example, in the case of the determination of the carrier frequency offset, the configuration of a device for computing the complex data rotation that will compensate for the effect of the carrier frequency offset on the data processed.

In the claims below, the terms used should not be interpreted as limiting the claims to the embodiments disclosed in the present description, but should be interpreted so as to include all equivalents that the claims are intended to cover by their wording and within the abilities of a person skilled in the art applying his or her general knowledge to the implementation of the teaching just disclosed.

The invention claimed is:

1. A data processing device comprising:
a memory;
a direct memory access controller comprising a receiving module configured to receive data coming from outside the device and for writing the data in a predetermined portion of the memory, as a main buffer memory;
a processing unit programmed to read and process data written by the receiving module in the main buffer memory area as a work area,
wherein:
the main buffer memory is divided between used space and free space;
the processing unit is further programmed to define the work area;
the direct memory access controller comprises a buffer memory manager configured to free data written in the main buffer memory, by defining a location of this data as a free space, only when this data is outside the work area; and
the direct memory access controller is configured to write data to the free space in parallel with the processing unit accessing data in the work area.

2. A device according to claim 1, wherein the processing unit is programmed to wait until the receiving module writes data received in the entire work area before reading and processing the data of the work area.

3. A device according to claim 1, wherein:
the receiving module is configured to write each data item received in a location of the main buffer memory indicated by a pointer as an input pointer;
the buffer memory manager is configured so as, after a data item has been written by the writing module, to move the input pointer toward a next location according to a predetermined circular path of the main buffer memory.

4. A device according to claim 1, wherein the processing unit is programmed to write data in the work area in place of data written by the receiving module.

5. A device according to claim 1, wherein the direct memory access controller comprises a transmission module configured to read data written in the main buffer memory and to transmit it outside the device.

6. A device according to claim 5, wherein:
the transmission module is configured to read and transmit, outside the device, the data written in the location indicated by a pointer, as an output pointer;
the work area is between a work area start pointer and a work area end pointer, according to a predetermined circular path of the main buffer memory;
the buffer memory manager is configured to free the data read and transmitted by moving the output pointer toward the next location according to the circular path, only if the output pointer is different from the work area start pointer.

7. A device according to claim 6, wherein the processing unit is programmed to define the work area by moving the work area start pointer and/or the work area end pointer.

8. A device according to claim 1, wherein
the processing unit is programmed to define an area, as an auxiliary work area, of another predetermined portion, as an auxiliary buffer memory, of the memory;
the processing unit is programmed to write data in the auxiliary work area;
the direct memory access controller is configured to read, transmit outside the device and free data of the auxiliary buffer memory, but only when it is outside the auxiliary work area.

9. A data processing chain, comprising:
a plurality of processing devices configured so as to process a data flow, wherein one of the processing devices is a device according to claim 1.

10. A device according to claim 1, wherein the direct memory access controller is configured to write data to the main buffer memory and free data written in the main buffer memory in a circular manner while avoiding writing data or freeing data in the work area.

11. A data processing method, comprising:
reading and processing written data by a processing unit, by a direct memory access controller, in a predetermined portion of a memory, as a main buffer memory;
defining, by the processing unit, an area, as a work area, in the main buffer memory;
reading and processing data written in the work area;
the main buffer memory being divided between used space and free space, freeing, by the direct memory access controller, data written in the main buffer memory, by defining a location of this data as free space, only when this data is outside the work area,
wherein the direct memory access controller is configured to write data to the free space in parallel with the processing unit accessing data in the work area.

12. A non-transitory computer readable medium including computer executable instructions for defining a work area in a portion, as a main buffer memory, of a memory of a device, when the computer executable instructions are executed by a processing unit of this device having read access to this work area,
the device further comprising a direct memory access controller configured to write data received from outside the device in the main buffer memory, the main buffer memory being divided between used space and free space, and the direct memory access controller further configured to free data written in the main buffer memory only when this data is outside the work area,
wherein the direct memory access controller is configured to write data to the free space in parallel with the processing unit accessing data in the work area.

* * * * *